(12) United States Patent
Mishra et al.

(10) Patent No.: US 7,551,558 B2
(45) Date of Patent: Jun. 23, 2009

(54) METHOD AND SYSTEM FOR CONTROLLING BANDWIDTH ALLOCATION

(75) Inventors: Shridhar Mubaraq Mishra, Berkeley, CA (US); Pramod Kumar Pandey, Singapore (SG); Guruprasad Ardhanari, Singapore (SG)

(73) Assignee: Infineon Technologies AG, Munich (DE)

( * ) Notice: Subject to any disclaimer, the term of this patent is extended or adjusted under 35 U.S.C. 154(b) by 493 days.

(21) Appl. No.: 10/526,886

(22) PCT Filed: Sep. 6, 2002

(86) PCT No.: PCT/SG02/00209

§ 371 (c)(1),
(2), (4) Date: Mar. 4, 2005

(87) PCT Pub. No.: WO2004/023745

PCT Pub. Date: Mar. 18, 2004

(65) Prior Publication Data

US 2006/0164988 A1 Jul. 27, 2006

(51) Int. Cl.
*G01R 31/08* (2006.01)
(52) U.S. Cl. ..................................... 370/230
(58) Field of Classification Search ........... 370/229, 370/230.1, 231.1–234, 235, 235.1, 236, 395.2, 370/395.21, 395.71, 395.72, 230
See application file for complete search history.

(56) References Cited

U.S. PATENT DOCUMENTS 6,122,252 A * 9/2000 Aimoto et al. ............. 370/235
6,252,848 B1 * 6/2001 Skirmont ................... 370/229
6,381,649 B1   4/2002 Carlson
7,023,799 B2 * 4/2006 Takase et al. ............. 370/230.1
2001/0007560 A1 * 7/2001 Masuda et al. ............. 370/401
2001/0014081 A1 * 8/2001 Kawasaki et al. .......... 370/235
2001/0025310 A1 * 9/2001 Krishnamurthy et al. .... 709/223
2002/0089929 A1 * 7/2002 Tallegas et al. ............ 370/230
2002/0093910 A1 * 7/2002 Yazaki et al. .............. 370/229
2002/0101888 A1 * 8/2002 Keck et al. ................ 370/537
2002/0114277 A1 * 8/2002 Kyusojin .................. 370/230.1
2002/0152306 A1  10/2002 Tuck, III
2002/0169921 A1 * 11/2002 Saitoh ....................... 711/5
2003/0012197 A1 * 1/2003 Yazaki et al. .............. 370/392

FOREIGN PATENT DOCUMENTS

| EP | 0 932 281 A1 | 7/1999 |
| EP | 1 030 485 A1 | 8/2000 |
| EP | 1 058 424 A2 | 12/2000 |
| GB | 2 367 715 A | 4/2002 |
| WO | WO 01/65765 A2 | 9/2001 |
| WO | WO 02/15488 A1 | 2/2002 |
| WO | WO 02/060098 A2 | 8/2002 |

* cited by examiner

*Primary Examiner*—Kwang B Yao
*Assistant Examiner*—Candal Elpenord
(74) *Attorney, Agent, or Firm*—Maginot, Moore & Beck

(57) ABSTRACT

A Ethernet switch 1 includes a monitoring unit 9 for policing the amount of traffic on each of a plurality of flows or groups of flows. The monitoring unit has a memory, implemented in hardware as a RAM memory, having a section of each of the flows or groups of flows, and acting as a token bucket for those flows or group of flows.

6 Claims, 1 Drawing Sheet

METHOD AND SYSTEM FOR CONTROLLING BANDWIDTH ALLOCATION

RELATED APPLICATIONS

The present rule is a group of five patent applications having the same priority date. Application PCT/SG02/000211 relates to an switch having an ingress port which is configurable to act either as eight FE (fast Ethernet) ports or as a GE (gigabit Ethernet port). Application PCT/SG02/000210 relates to a parser suitable for use in such as switch. Application PCT/SG02/000207 relates to a flow engine suitable for using the output of the parser to make a comparison with rules. Application PCT/SG02/000209 relates to a monitoring bandwidth consumption using the results of a comparison of rules with packets. Application PCT/SG02/000213 relates to a combination of switches arranged as a stack. The respective subjects of the each of the group of applications other than in combination with the technology described in the other four applications, but the disclosure of the other applications of the group is incorporated by reference.

FIELD OF THE INVENTION

The present application relates to a technique for identifying when the volume of traffic in one or more data flows through a switch is excessive, and taking measures accordingly.

BACKGROUND OF INVENTION

The techniques known as "bandwidth policing" limit the traffic of data which is attributable to individual users or groups of users, for example according to the conditions of a contractual Subscriber Level Agreement (SLA). Bandwidth policing prevents users from using resources for which they have not paid, and, in the case of multiple users who share a particular resource, ensures that one user does not obtain an unfair share of that resource. A bandwidth policing engine is present for example in Access Aggregators and Ethernet switching equipment user for Customer Access in the last mile.

An example of bandwidth policing is in the context of the MDU (multiple dwelling units) or MTU (multiple tenant units), where a plurality of users in a building communicate with a communication network such as the Internet using a shared switching system (router).

One known algorithm for performing bandwidth policing is based on "token buckets". Let us assume that a packet flow to be policed consists of a certain user transmitting packets. In this case, a "token bucket" is assigned to that flow. The user is notionally allocated "tokens" at a uniform rate (called a "replenish rate"). Whenever the user sends a packet he or she uses up as many tokens as the length of the packet. Whenever the user attempts to send a packet which is greater than the remaining number of tokens, action is taken, generally of one of the following types:

The packet is simply deleted (in the case of a transmission protocol such as TCP the transmission of packets can recover from packets being lost).

"Flow control". A "back pressure" is applied to the user, for example a signal transmitted to the source of the packets indicating that no further packets should be sent for a certain time, or indefinitely until a signal is transmitted to permit transmission to recommence.

The quality of service is reduced, for example by lowering the priority level of packets transmitted by the user.

Using this technique, the maximum average rate at which the user can transmit packets is limited to the replenish rate. In the event that the user does not use his or her tokens, they accumulate in the bucket up to a certain maximum: a "burst size". A user with a full bucket can send a single burst of packets having a total size up to the burst size irrespective of the replenish rate r.

A known variation of the above technique is to take a first action when the number of tokens in the bucket falls below a first level, and a second and more severe action when the number of tokens falls below a second level. The first level defines the "bucket size" such that a packet can always be sent from the full bucket without action being taken, while the second level defines an "extended bucket size", which can determine the time averaged maximum rate of sending packets.

Conventionally the above bandwidth policing algorithm is implemented using software in the router. However, this results in a computing overhead and slows down the operation of the router.

SUMMARY OF THE INVENTION

In general terms the present invention proposes that in an Ethernet switch the bandwidth policing for each of a plurality of flows or groups of flows is performed using a bandwidth monitoring device which is implemented in hardware as a RAM memory. The memory has a section for each of the flows or group of flows.

Each memory section has a first portion for storing a token number and one or more control parameter indication portions for storing data indicating control parameters of the corresponding flow or group of flows.

Preferably, the device further contain a plurality of parameter storage registers for storing the control parameters, and the control parameter indication portions of a given section indicate one or more of the parameter storage registers. For example, if the control parameter indication portions of a given section indicate a given one or more of the parameter storage registers, then the control of the flow or flows associated with that memory section are controlled based on the control parameters in the indicated parameter storage registers.

The terms "register" and RAM memory are used here, as is conventional in this art, to be different from each other and such that a register (e.g. implemented as flip-flops) is not a kind of RAM. In implementation terms, a RAM memory is cheaper to implement but less flexible.

BRIEF DESCRIPTION OF THE FIGURES

Preferred features of the invention will now be described, for the sake of illustration only, with reference to the following figures in which.

DETAILED DESCRIPTION OF THE EMBODIMENTS

Figure 1:
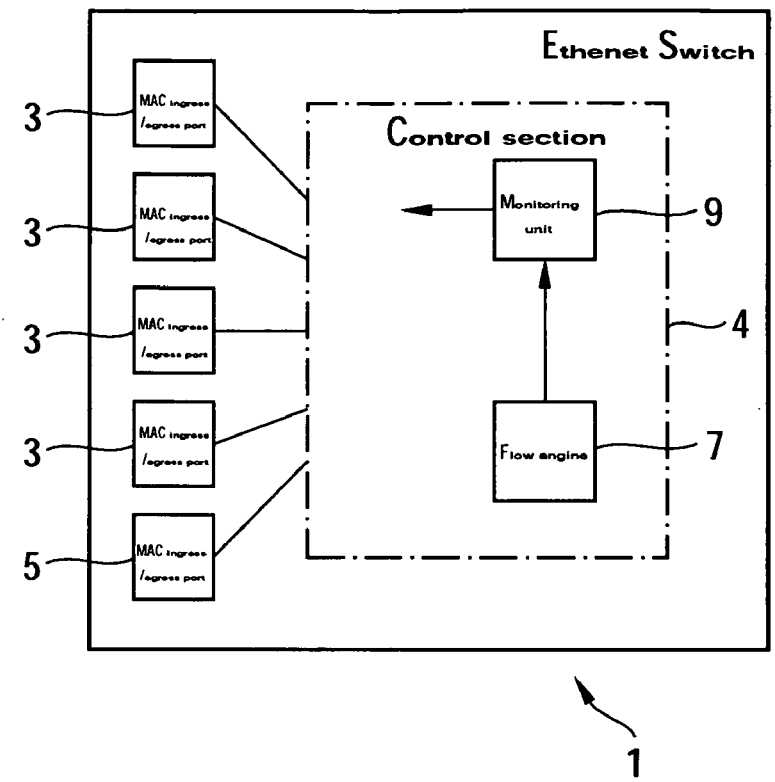
FIG. 1 shows schematically a bandwidth monitoring system which is an embodiment of the invention.

Referring to FIG. 1 an embodiment of the invention is shown which is an Ethernet switch 1, having a plurality of MAC ingress/egress ports 3 connected to user devices (which may be located within a single building, for example). Port 5 is an ingress/egress port connected to an external communication network such as the Internet.

The Ethernet switch further includes a control section 4 having a flow engine 7 for examining packets passing through the Ethernet switch and determining which "flow" they belong to, in other words which of the ports 3, 5 they come from and which of the ports 3, 5 they are directed to. Note that optionally any one or more of the flows may be associated, to form groups of flows. For example, the flows from a given one of the ports 3 to the port 5 and from the port 5 to the same port 3 may be associated in this way. In this case, the flow engine 7 may, rather than deciding the exact flow to which the packet belongs, determine only which group of flows is belongs to. For each packet flowing through the switch, the flow engine makes this determination and passes the information in the form of a flow ID together with a measured size of the packet, to a monitoring unit 9 also located in the control section 4.

The flow engine 7 may optionally be of the sort which is the subject of a separate and copending patent application referred to above, having an even filing date, the disclosure of which is incorporated herein by reference. The flow engine has a number of user defined "rules", each corresponding to a flow or group of flows. The flow engine compares bits parsed from the packets with these rules to determine which of the "rules" the packets obeys, and assigns the packet to the flow or group of flows corresponding to that rule.

The monitoring unit 9 issues policing instructions based on the operations described below. As mentioned below, some policing instructions are sent to the MAC ports 3, 5. Others, such as instructions to delete packets, are sent to sections of the control section 4 which implement them according to known methods.

The monitoring unit 9 has a memory having a data structure shown in Table 1. The data structure has a number of rows which each correspond to one of the rules (i.e. a flow, or group of flows, to be monitored). For example, if there are 1024 flows, or groups of flows, to be monitored, then Table 1 has 1024 rows as illustrated.

TABLE 1

| Rule Number | Bandwidth counter (32 bits) | B/EB Selection | Rate Selection |
|---|---|---|---|
| Rule ID 0 | | 3 | 4 |
| ... | ... | ... | ... |
| Rule ID X | | 7 | 5 |
| ... | ... | ... | ... |
| Rule ID 1023 | | 4 | 6 |

For each of the rows, the memory contains a bandwidth counter (e.g. 32 bits) which functions as the corresponding token bucket.

Furthermore, the row contains one or more control parameter indication portions. In Table 2, there are two such portions, a B/EB selection portion and a rate selection portion. Each of these portions is preferably of low size such as 2 to 4 bits. In the embodiment illustrated each of the registers is 3 bits long.

The monitoring device 9 further includes 24 programmable parameter storage registers, 16 of which are shown in Tables 2, and 8 of which are shown in Table 3. Each of the 24 registers contains 32 bits, but their values are not shown (left blank) in Tables 2 and 3.

TABLE 2

| B/EB selection | B value | EB value |
|---|---|---|
| 0 | | |
| 1 | | |
| 2 | | |
| 3 | | |
| 4 | | |
| 5 | | |
| 6 | | |
| 7 | | |

Eight of registers of Table 2 each store B values, and eight of the registers store EB values. B values and EB are paired, and indexed by a single value of the B/EB selection. Thus, the 3-bit B/EB selection portion of a given one of the rows of Table 1 indicates a row of Table 2, and this in turn gives the B value and EB value associated with that rule (flow or group of flows).

TABLE 3

| Rate selection |
|---|
| 0 |
| 1 |
| 2 |
| 3 |
| 4 |
| 5 |
| 6 |
| 7 |

The eight 32-bit registers of table 3 store respective values of a replenish parameter r, and are indexed by the rate selection values of Table 1. Therefore, a given row of Table 1 (i.e. one rule, or one flow or group of flows) is associated using the corresponding 3-bit rate selection value in Table 1 with one of the 32-bit replenish parameters r.

This provides a certain programming flexibility to the operator of the switch at relatively low cost. He can select which 32-bit values are inserted into Tables 2 and 3, and, for each flow, or group of flows, which of the rates in Tables 2 and 3 is used.

There are three processes which access the data structure, which, in descending order of priority, are as follows:

1) Update.

An update occurs when a flow match is detected, i.e. the flow engine 7 identifies which rule a packet obeys, and indicates that flow or group of flows and the size of the packet to the monitoring unit 9 (let us say, value L corresponding to row L of Table 1). The value of the corresponding bandwidth counter (let us say, value b) is read, and it is determined which of the following classifications is obeyed:

| Classification | Criterion | Action |
|---|---|---|
| 1) Conforming | $B \leq b - L$ | Forward packet |
| 2) Loosely conforming | $EB \leq b - L < B$ | Policing Action 1 |
| 3) Not conforming | $b - L < EB$ | Policing Action 2 |

Figure 2:
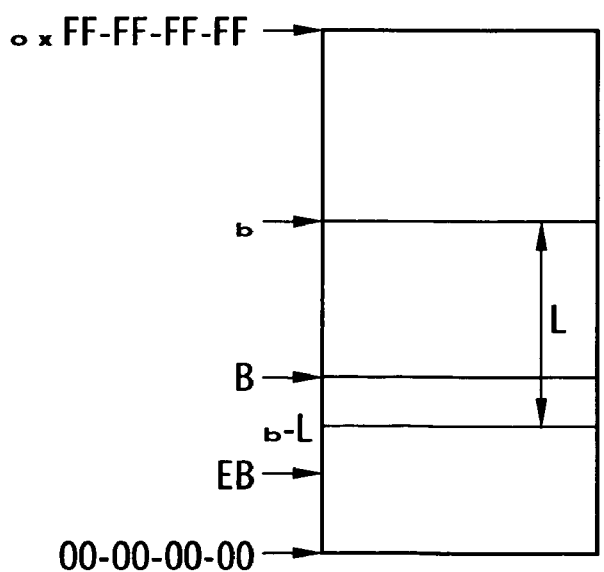
FIG. 2 is an illustration of the monitoring process shown in FIG. 1.

This process is illustrated in FIG. 2 in the case of a loosely conforming packet. FIG. 2 shows that the token bandwidth counter (bucket) has a maximum value of FF-FF-FF-FF (the maximum value of 32 bits in hexadecimal), and a minimum value of 00-00-00-00.

Each of the policing options may include one or more items chosen from the following list:

0) Drop the packet
1) Assert flow control on corresponding port, if this option exists
2) Reduce the priority of the packet
3) Forward the packet.

If item 0 is chosen, then only further item 1 is compatible with it. Items 3 and 2 cannot be used in combination with item 1.

For example, policing action 1 may be to forward the packet but reduce its priority (item 2). Alternatively, it may be to delete the packet and assert flow control (items 0 and 1). Policing action 2 may be to delete the packet and assert flow control (items 0 and 1).

If the action includes forwarding the packet, the b is reset to b-L. Otherwise, if the action includes deleting the packet, b is not reset.

The reason for providing for Loosely Conforming packets is because if a packet is received at a time t between two replenish periods (T apart) with a length L such that b+(Rt/T)−L is greater than B, then such a packet would be passed if the replenish had been a truly uniform process. Such packets are classified as loosely conforming, and may be forwarded if this is the action programmed by the user.

This entire operation of reading, subtraction, comparison and memory update can be computed in two or three clock cycles.

2) Replenishment

The bandwidth counters (buckets) are replenished at intervals by a number of tokens r. This may happen every C cycles. Instead of replenishing all the buckets at the same time, one buckets is replenished at every C/N cycles, where N is the number of buckets. Thus, each bucket is replenished every C cycles, but the replenishment cycles for different buckets is phase shifted by multiples of C/N cycles.

Replenishment involves the following steps:
Reading the counter value and control bits of the bucket.
Finding the value of r corresponding to the rate selection value.
Adding r to the counter value.
Comparing it with the value of FF-FF-FF-FF.
Writing a value to the counter which is the lower of FF-FF-FF-FF and b+r.

An update process gets priority over replenishment. In this case, the replenish process is postponed. Since update and replenishment do not take place at the same time, the adder can be shared between the two processes.

3. Programming

In this process, the control values are written into the control parameter indication portions. Table 4 shows the typical rates for this. Optionally, it may be possible to write a value to the counter field also, for debugging processes. This process get the least priority.

TABLE 4

| Rate | Rate Settings |
| --- | --- |
| 8 kbits/s | 1 (Minimum rate shaping resolution |
| 64 kbits/s | 8 |
| 100 Mbits/s | 0x30D4 |
| 1 Gbits/s | 0x1E848 |
| No rate limiting | Greater than 0x1E848 |

One issue which arises in the embodiment discussed above is how policing is carried out in the case that it is desired to perform different policing actions for different ones of the flows. It would be possible to store action bits for each of the flows indicating which flows are to be given which policing action(s), such that when a packet is found to be loosely conforming or non-conforming, the action bits for flow control are checked. However, this solution significantly increases the memory requirements of the system. A preferred solution is for the table 1 to be partitioned into ranges in the vertical direction, and for enough programmable action bits to be provided to store different policing actions for each of the ranges. This means that the user is limited to applying the flow control police action to ranges of consecutive flows in Table 1. When the packet classification engine classifies a packet to one of these flows, and this packet is found to be loosely conforming or non-conforming, the action bits for flow control are checked. If flow control is enabled, then a flow control signal is asserted to the corresponding MAC. This causes the MAC to send a pause packet to the transmitting station to which it is connected, indicating that the transmitting station stops transmission for a fixed time or until further notice. Pause frames are specified in IEEE standard 802.1x.

Flow control is de-asserted as follows. While replenishing buckets with rule IDs in the range reserved for flow control, the monitoring unit observes that the number of tokens is less than B, so that flow control has been applied. The replenish process checks the number of tokens which would remain after replenish. If it is above the burst size B, flow control is de-asserted to the corresponding MAC. This causes the MAC to send a pause packet to the transmitting station which a pause time field set to 0. The transmitting station thus re-starts transmission.

The invention claimed is:

1. A data switch for passing packets as sets of one or more packet flows between a plurality of ports, the data switch comprising:
  a flow detection device configured to detect a set of one or more packet flows to which each packet belongs; and
  a bandwidth monitoring device having a RAM memory with a section corresponding to each set of one or more packet flows, the memory sections each containing a bandwidth counter for the corresponding set of one or more packet flows, the bandwidth monitoring device being configured to:
  subtract the size of the packet from a value of the bandwidth counter corresponding to the detected set of one more packet flows to obtain an adjusted value;
  issue a policing instruction if the adjusted value is equal to or lower than a first predetermined level corresponding to a first set of one or more flows and a second predetermined level, different from the first predetermined level, corresponding to a second set of one or more flows;
  replace the value of the bandwidth counter corresponding to the detected set of one more packet flows by the adjusted value in the event that the packet is transmitted by the switch; and
  replenish each bandwidth counter with a predetermined value at a regular intervals;
  wherein the RAM memory includes control parameter indication portions for each of the sets of one or more flows, the control parameter indication portions indicating respective registers for storing the data representative of the one or more predetermined levels.

2. The data switch according to claim 1 wherein the plurality of sets of one or more flows are grouped into ranges, and wherein the policing instructions in respect of a particular set of one or more flows depends upon the range in which the set of one or more flows lies.

3. The data switch according to claim 1, wherein each set of one or more flows is associated with one of a plurality of policing instructions, said plurality of policing instructions including dropping a packet and reducing a priority packet.

4. A method of policing flows of packets within a data switch for passing packets between a plurality of ports, the method including:

storing a bandwidth counter for each of a plurality of sets of one or more flows in a RAM memory, the RAM memory having a corresponding section for each of the sets of one or more flows;

detecting the set of one or more flows to which a packet belongs;

subtracting the size of the packet from a value stored in the bandwidth counter corresponding to the set of one or more flows to obtain an adjusted value;

issuing a policing instruction if the adjusted value is equal to or lower than to a first predetermined level corresponding to a first set of one or more flows and a second predetermined level, different from the first predetermined level, corresponding to a second set of one or more flows;

if, despite any such policing instruction, the packet is transmitted, adjusting the value stored the bandwidth counter corresponding to the set of one or more flows by the size of the packet; and replenishing each bandwidth counter with a predetermined value at regular intervals;

wherein the RAM memory includes control parameter indication portions for each set of one or more flows, the control parameter indication portions indicating respective registers for storing the data representative of the predetermined levels.

5. The method according to claim 4 wherein the sets of one or more flows are grouped into ranges, and wherein the policing instructions in respect of a particular set of one or more flows depends upon the range in which the set of one or more flows lies.

6. The data switch according to claim 4, wherein each set of one or more flows is associated with one of a plurality of policing instructions, said plurality of policing instructions including dropping a packet and reducing a priority packet.

* * * * *